United States Patent
Kobashi

[11] 3,759,288
[45] Sept. 18, 1973

[54] SAFETY VALVE ASSEMBLY

[75] Inventor: Uichiro Kobashi, Kariya City, Aichi pref., Japan

[73] Assignee: Aisin Seiki Kabushiki Kaisha, Kariya City, Aichi pref., Japan

[22] Filed: Apr. 8, 1971

[21] Appl. No.: 132,460

[52] U.S. Cl.............. 137/498, 137/504, 303/84 A
[51] Int. Cl.................... B60t 8/26, F16k 31/363
[58] Field of Search................ 137/498, 504, 503, 137/509, 465, 466, 461, 460, 459, 456; 303/84 A; 188/151 A

[56] References Cited
UNITED STATES PATENTS

| 3,627,385 | 12/1971 | Stokes | 303/84 A X |
|---|---|---|---|
| 2,195,214 | 3/1940 | Jacob | 303/84 A |
| 2,568,311 | 9/1951 | Wise et al. | 303/84 A X |
| 2,968,153 | 1/1961 | Hackett | 303/84 A X |
| 3,416,560 | 12/1968 | Bruno | 137/503 X |
| 3,463,554 | 8/1969 | Bueler | 303/84 A X |
| 3,496,962 | 2/1970 | Tuzson | 137/504 |

Primary Examiner—Henry T. Klinksiek
Assistant Examiner—Robert J. Miller
Attorney—Sughrue, Rothwell, Mion, Zinn & Macpeak

[57] ABSTRACT

This invention relates to improvements in and relating to a safety valve assembly, especially to be fitted in the hydraulic brake system for wheels of an automotive vehicle, although the invention may find its application in other uses in a hydraulic pressure piping system.

The safety valve assembly is adapted for operation to close the hydraulic pressure piping system when the outlet liquid quantity exceeds the inlet liquid quantity over a certain predetermined degree. This feature is especially valuable to interrupt oil outlet, when, as an example, a burst or the like cause should take place in the brake piping system.

6 Claims, 5 Drawing Figures

INVENTOR
UICHIO KOBASHI
BY Sughrue, Rothwell, Mion, Zinn & Macpeak
ATTORNEYS

SAFETY VALVE ASSEMBLY

This invention relates to improvements in and relating to a safety valve assembly, especially to be fitted in the hydraulic brake system for wheels of an automotive vehicle, although the invention may find its application in other uses in a hydraulic pressure piping system.

The safety valve assembly is adapted for operation to close the hydraulic pressure piping system when the outlet liquid quantity exceeds the inlet liquid quantity over a certain predetermined degree. This feature is especially valuable to interrupt oil outlet, when, as an example, a burst or the like cause should take place in the brake piping system.

It is a main object to provide an improved safety valve assembly adapted to interrupt outgoing oil from a pressure oil piping system when the oil outlet rate should exceed the oil inlet rate over a certain predetermined value.

It is a further object to provide a safety valve assembly of the above kind which operates in a positive and reliable manner.

In order to fulfill the aforementioned objects, the safety valve assembly according to the invention comprises a unique variable orifice means bridging between a hydraulic piston and a cylinder slidably mounting the piston. This orifice means comprises a first ring-shaped recess formed on the hydraulic piston and a second ring-shaped recess formed in the wall of the cylinder, said recesses cooperating with each other, so as to provide said variable orifice in a very unique manner.

These and further objects, features and advantages of the invention will become more apparent when read the following detailed description of the invention by reference to the accompanying drawings illustrative substantially of a preferred embodiment of the invention.

Figure 1:
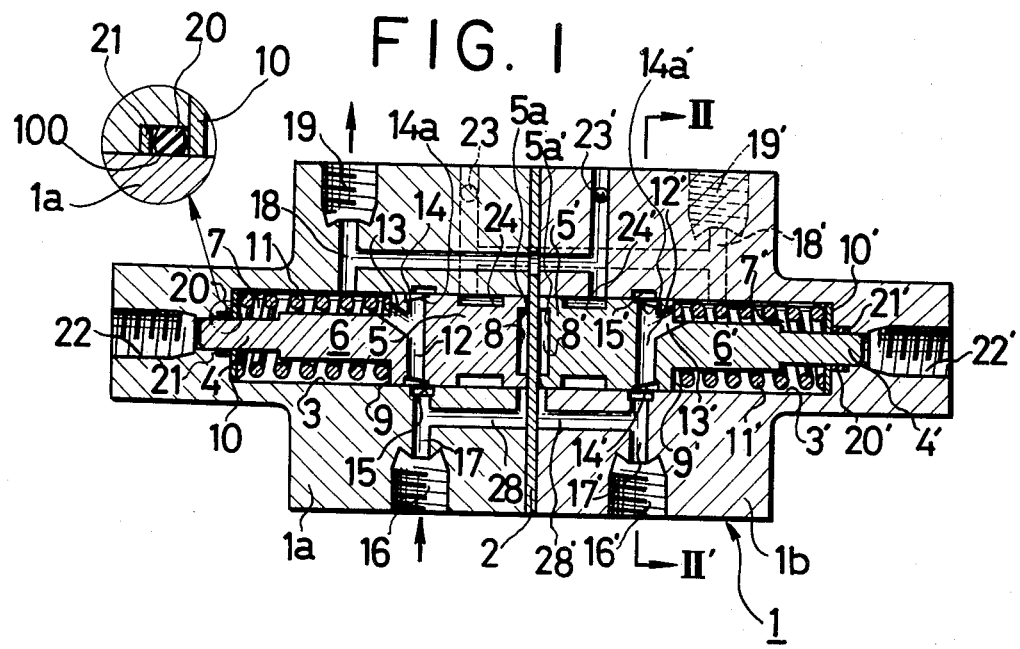
FIG. 1 is an axial central sectional view of the safety valve assembly embodying the principles of the invention.
Figure 2:
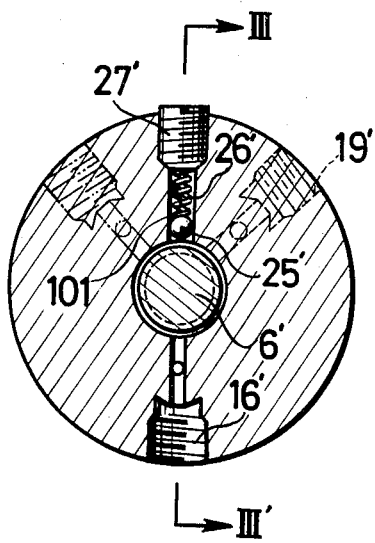
FIG. 2 is a cross-sectional view of the safety valve assembly shown in FIG. 1, taken substantially alon a section line II—II' shown therein.
Figure 3:
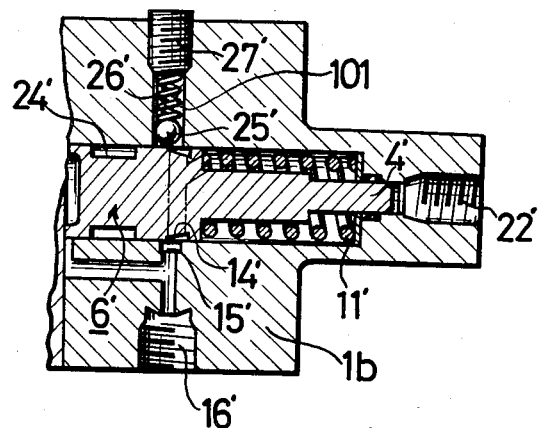
FIG. 3 is a part of an axial sectional view of the same safety valve assembly, taken substantially alon a section line III—III' shown in FIG. 2.

Referring now to FIGS. 1–3, numeral 1 represents a stationary valve housing fixedly mounted on a certain stationary member, preferably the chassis of an automotive vehicle, although not specifically shown. This housing comprises two housing elements 1a and 1b which are fixedly united together with a separator plate 2 therebetween and by means of suitable connection flanges, not shown, and a plurality of fixing bolts, again not shown only for simplicity. These housing elements are of symmetrical design as shown, so as to be adapted for use in duplicated hydraulic braking systems to be described. For simplicity, therefore, the left-hand housing elements 1a only will be described hereinbelow in detail, and a duplicated description of the right-hand housing elements 1b will be omitted. The corresponding parts of the right-hand housing element 1b are illustrated with respective same reference numerals, each being attached with a prime for easy comparison and better understanding of the invention.

Housing element 1b is formed with an axial bore 3 in which a stepped piston 6 having a smaller piston part 4 and a larger piston part 5 is slidably mounted. By the provision of the smaller or reduced piston part 4, a ring-shaped working chamber 7 is formed within the left part of said cylinder bore 3 around the piston part 4. The larger piston part 5 is formed in its inner end surface with a recess 5a. At the right-hand end of said bore 3, there is formed an inner working chamber 8. Thanks to the provision of the said recess 5a, a reduced inner working chamber is maintained, even when the stepped piston 6 is positioned at its rightmost position as shown in FIG. 1 and kept in contact with the separator plate 2.

Between the larger and smaller piston elements, there is formed a ring shoulder 9 on the piston 6; a compression coil spring 11 having a certain predetermined initial tension is mounted between the shoulder 9 and the outer end of the bore 3 and within the ring chamber 7, thus the piston 6 being urged resiliently to move rightwards in FIG. 1 against separator plate 2. In fact, the outer end of said spring 11 is mounted on a ring seat 10.

Through the material of the larger piston part 5, there are formed a lateral bore 12 which has a communication passage 13 for fluid communication of the latter with the ring chamber 7. At the upper end of lateral bore 12, when seen in FIG. 1, there is provided a ring-shaped recess 14 having an inclined bottom 14a which is, however, perforated and kept in fluid communication with said lateral bore 12.

Substantially in opposition to the tapered ring recess 14 with the piston 6 is positioned as shown in FIG. 1, a ring recess 15 is formed in the inner wall surface defining the bore 3. As will become more apparent, these recesses 14 and 15 cooperate with each other, so as to provide a kind of variable orifice when the piston 6 operates.

Numeral 16 represents an inlet port formed in the body of cylinder housing 1 and connected fluidically with an outlet of a conventional duplicate type master cylinder for receiving pressure oil therefrom, as will become more apparent as the description proceeds. In an alternative measure, however, this inlet port can be connected hydraulically with a separate pressure oil supply source, such as an accumulator.

This inlet port 16 is connected with a lateral passage 17 kept in fluid communication with said recess 15. An outlet port 19 is formed in the cylinder housing 1, said port being connected through a brake piping, not shown in FIG. 1 with wheel cylinder(s) as conventionally. This port 19 is kept in fluid communication with a lateral passage 18 which is also formed in the body of housing 1 and kept in turn in fluid communication with the ring chamber 7.

Numeral 22 represents a substantially screwed axial bore adapted for receiving the outer end part of said reduced piston part 4; a sealing ring 20 for this piston part and a back-up ring 21 for the sealing ring are provided in a concentric recess 100, so as to provide a proper sealing effect thereat. An alarm switch can be provided in the bore 22 so as to signal an operational failure of the left-hand half element of the safety valve assembly.

Numeral 23 denotes a plug which is necessary to provide during and after the manufacturing job. This plug 23 naturally serves for establishing necessary seal for attaining an effective seal for the hydraulic passage system formed within the body of the valve housing element 1a.

As may be well supposed from FIGS. 2 and 3 concerning the remaining housing element 1b, the former element 1a is formed with a lateral bore 101 containing a detent ball corresponding to 25' which is backed up with a pressure spring corresponding to 26' shown in FIGS. 2 and 3. The outer end of the bore 101 is closed by a screw plug corresponding to that shown at 27'.

Figure 4:
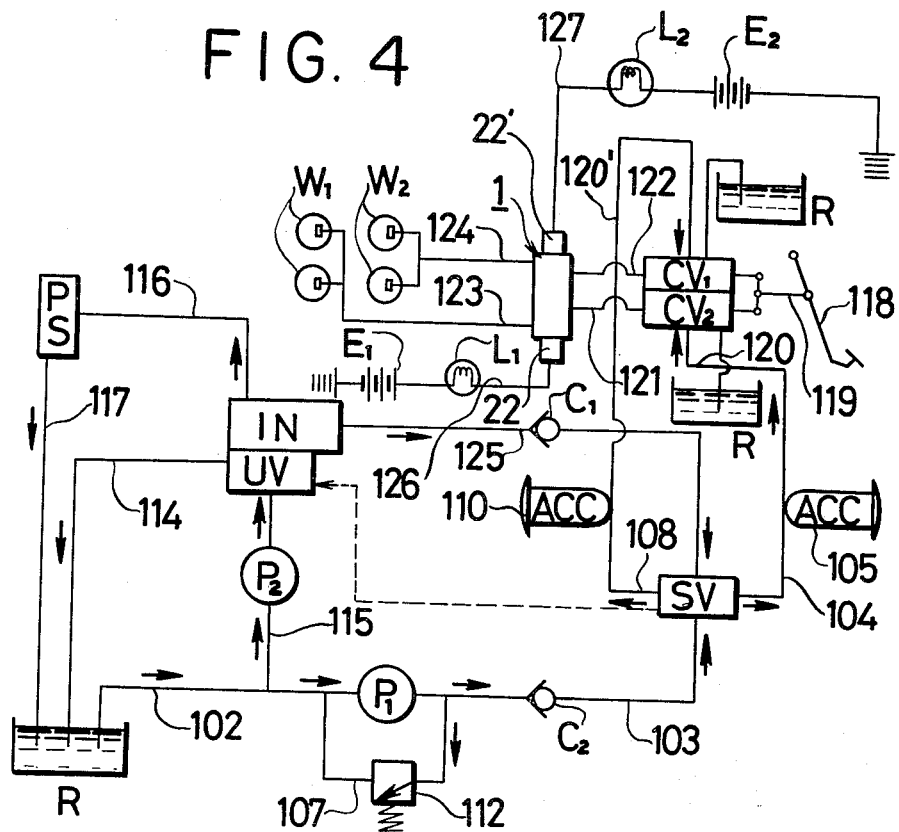
FIG. 4 is a schematic flow chart of an automotive brake system which has been fitted with the safety valve assembly shown in the foregoing.

An arrangement for dual brake systems and fitted with a safety valve assembly is schematically shown in FIG. 4.

In this figure, R denotes a reservoir tank containing oil as hydraulic braking medium. This arrangement includes a high pressure pump $P_1$ and a low pressure pump $P_2$ as shown. The safety valve assembly according to this invention is denoted as 1 as before.

When pump $P_1$ is operated, it sucks oil from the reservoir R through suction piping 102 and delivers through delivery piping 103 containing check valve $C_2$, and auxiliary safety valve SV and further piping 104 to a first accumulator 105 which is connected to a control valve $CV_1$ of a dual control valve. Across the pump $P_1$, a by-pass circuit 107 is provided so as to feed pressure oil at a certain predetermined pressure to accumulator 105. Pressure oil having the same pressure level is delivered through safety valve SV and piping 108 to a second accumulator 110 which communicates with a control valve $CV_2$ of a dual control valve through a further piping 111.

Upon charge of enough quantity of pressure oil to both accumulators 105 and 110, oil will circulates from pump $P_1$ through the by-pass circuit 107 including a relief valve 112.

The hydraulic pressure conveyed to safety valve SV acts through piping 113 upon conventional unloading valve UV as pilot pressure, while piping 114 maintains hydraulic communication between reservoir R and unloading valve UV.

Low pressure pump $P_2$ is provided in a piping 115 which leads from piping 102 to unloading valve UV.

PS denotes a conventional power steering mechanism which is fed with oil from unloading valve UV through a fluid pressure intensifier IN of conventional design and a piping 116. A further piping 117 connects the power steering mechanism PS to reservoir R.

As conventionally, the unloading valve UV is designed and arranged in such a way that when the accumulators 105 and 110 are charged enough with oil of predetermined pressure, it will allow the pressure oil delivered from pump $P_2$ to flow through intensifier IN and piping 116 to the mechanism PS under non-load conditions. The pilot pressure necessary for this purpose is delivered to the unloading valve UV from the auxiliary safety valve SV through piping 113.

In the arrangement shown in FIG. 4, dual control valves $CV_1$ and $CV_2$ of known design are designed and arranged to be controlled by movement of a conventional brake pedal 118 and a mechanical link means 119 only schematically shown.

These control or distributing valves $CV_1$ and $CV_2$ are hydraulically connected through respective piping means 120 and 120' with reservoir R, on the one hand, and through respective pipings 121 and 122 with the valve assembly 1, on the other. These pipings 121 and 122 can be deemed as connected with the aforementioned respective inlet ports 16 and 16' in the foregoing.

Two outlet ports such as at 19 and 19' in the foregoing of the safety valve assembly 1 are hydraulically connected through respective pipings 123 and 124 to wheel brake cylinders of known design, respectively, which are only schematically shown at $W_1$ and $W_2$.

Wheel cylinders $W_1$ may be deemed as those for the front wheels of the automotive vehicle and, in the similar way, wheel cylinders $W_2$ may be deemed as those for the rear wheels of the vehicle.

A further check valve $C_1$ is provided in a piping 125 which is arranged between said intensifier IN and auxiliary safety valve SV.

Screw plugs 22 and 22' shown more specifically in FIG. 1, yet only schematically shown in FIG. 4 are practically plug-in switches which are electrically connected through respective leads 126 and 127, alarm lamps $L_1$ and $L_2$ and respective batteries $E_1$ and $E_2$ to earth. Therefore, it will be seen when the respective hydraulic pistons 6 and 6' are caused to move outwardly an excess amount as caused by brake pipe burst or the like dangerous hydraulic causes, the related alarm lamp $L_1$ or $L_2$, as the case may be, ignites for the display of the disabled hydraulic brake system.

When the oil pressure accumulated in either or both of accumulators 105 and 110 should drop below a predetermined level, the hydraulic pilot pressure acting from safety valve SV through piping 113 upon unloading valve UV wil become less than the established value. In this case, the oil pressure delivered from low pressure pump $P_2$ through unloading valve to intensifier IN will be delivered therefrom as having intensified, through piping 125 to safety valve SV so that the accumulator 105 or 110 or both will recover its regular oil pressure. On the other hand, the intensified oil pressure will be delivered from the intensifier IN to the power steering mechanism PS which can thus operate as before. Excess oil will return from the mechanism PS through piping 117 to the reservoir R. Therefore, in spite of occasionally encountered brake pipe bursting, the wheel brake cylinders $W_1$ and $W_2$ may operate satisfactorily.

It will be easily understood from the foregoing that the number of constituting safety valve elements can be increased to more than two, when occasion may desire it.

Although not specifically described in the first embodiment, the ouer end of the smaller piston is exposed to open atmospheric pressure.

Although not shown, said second chamber defined mainly by said smaller piston part constitutes an atmospheric pressure chamber.

Figure 5:
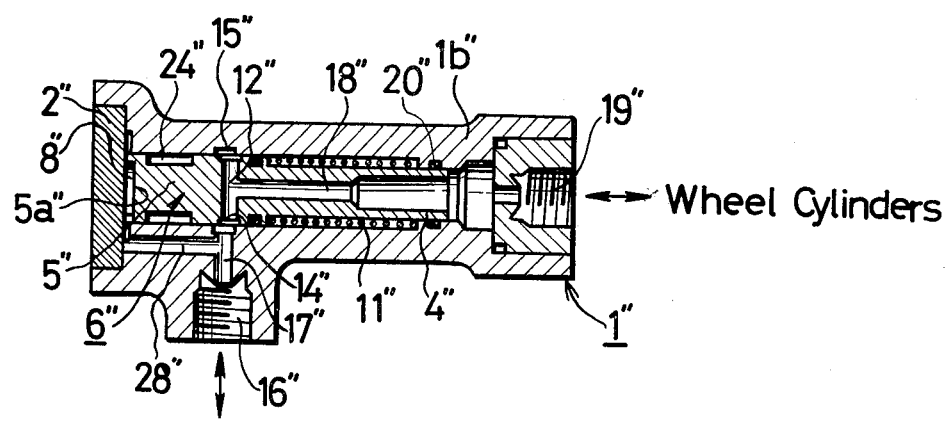
FIG. 5 is a similar view to the right-hand half of FIG. 1, illustrating a modification of the safety valve assembly shown therein.

In FIG. 5, a modified embodiment from that shown and described in the foregoing is shown. Main similar constituent parts are denoted with same respective reference numerals as 1; 1b; 2; 4; 5; 5a; 6; 8; 11; 12; 14; 15; 16; 17; 18; 19; 24 and 28, yet being attached with two primes for easier and clearer identification and comparison. As seen, main difference resides in the modified arrangement of the passage 18" extending axially in place of laterally and within the material of the stepped piston 6''. In correspondence therewith, the outlet port 19'' is also arranged axially of the valve assembly in place of laterally. It will be seen from the foregoing that a similar function may be obtained with a more simplified structure.

Although not shown, the detent or lock means comprising the combination of ball and back-up spring and adapted for cooperation with recess 24'' is also provided in this modification.

The operation of the valve assembly so far shown and described is as follows:

When pressure oil is fed to inlet port 16, oil is delivered partly through passages 17 and 28 to the working chamber 8, and partly through passage 17, recesses 15 and 14, passages 12 and 13 to the ring chamber 7, thence through passage 18 and outlet port 19 to wheel cylinder(s) for exerting braking effort to the related automotive wheel(s).

It is now assumed:
working area of larger piston element 5 — $A$;
working area of smaller piston element 6 — $a$;
initial spring force at 11 — $F$;
spring constant at 11 — $K$;
deflection of spring at 11 — $X$; and
pressure of fed pressure oil — $P_x$;

At the initial stage of normal brake application with no loss of oil pressure in the related hydraulic brake system, the following relation will be established:

$$A \cdot P_x \leqq (A - a)P_x + F$$

At this operational stage, the piston will be kept at the shown position in FIG. 1.

With the oil pressure increased by increasing the foot pressure exerted on a conventional brake pedal mechanically linked with the piston means included in the master cylinder, although not specifically shown in FIG. 1 on account of its very popularity, the following formula will be established:

$$A \cdot P_x > (A - a)P_x + F$$

Under these operational conditions, piston 6 will be shifted from the shown position (FIG. 1) by a certain distance expressed by:

$$X = (a \cdot P_x - F/K)$$

It will be seen that under these operational conditions, the effective passage area of the variable orifice formed by the mutual cooperation of ring recesses 14 and 15 will become correspondingly smaller in a variable way, thus the liquid flow from port 6 to port 19 being subjected to a corresponding limitation. However, it should be noted at this stage that spring force $F$ and piston area $a$ are so selected that the said variable orifice can not be closed with oil pressure $P_x$ if it be within prescribed normal working range. When the braking action reaches its maximum value or nearly so, practically no oil flow will be seen through said variable orifice and there is only a static oil communication thereacross so that the presence of said flow limitation therethrough does not affect in adverse sense upon the braking function now being kept in force.

When an oil leakage should occur in the brake piping means leading from outlet port 19 to wheel cylinder(s) during brake application, a substantial pressure differential will take place between inlet port 16 and outlet port 19 by the provision of said variable orifice, thereby piston 6 being shifted leftwards in FIG. 1 against the action of spring 11, and the ball 25 entering into ring groove 24 under the action of an urging spring as illustrated at 26' in FIG. 3, so as to lock the piston 6 against the cylinder 3.

Since the variable orifice provided by the cooperation of grooves 14 and 15 is closed in this case, no pressure oil is delivered to outlet port 19 and the inlet port 16 and its related passages may well be kept in a hydraulically urged or urgeable condition.

The embodiments of the invention in which an exclusive property or privilege is claimed are as follows:

1. A safety valve assembly comprising a stationary valve body housing, an inlet port, an outlet port, said port being formed in said body, an axial bore formed in said body, a stepped piston having a larger part and the smaller part slidably mounted in said bore, a first chamber formed within said bore and defined in part by said larger piston part, means for fluidically connecting said inlet port with said first chamber for admitting hydraulic pressure to shift said piston in one direction, a second chamber formed within said bore and defined in part by said smaller piston part, said second chamber being a hydraulic chamber disposed in fluid communication with said outlet port with the outer end of said smaller piston being exposed to atmospheric pressure, spring means acting upon said piston so as to oppose hydraulic pressure in said first chamber, fluid passage means formed in said piston for fluid communication between said inlet port and said outlet port and variable orifice means for throttling fluid flow from said inlet port to said outlet port responsive to movement of said piston in said one direction.

2. A safety valve assembly comprising a stationary valve body housing, an inlet port, an outlet port, said port being formed in said body, an axial bore formed in said body, a stepped piston having a larger part and a smaller part slidably mounted in said bore, a first chamber formed within said bore and defined in part by said larger piston part, means for fluidically connecting said inlet port with said first chamber for admitting hydraulic pressure to shift said piston in one direction, a second atmospheric pressure chamber formed within said bore and defined in part by said smaller piston part, spring means acting upon said piston so as to oppose hydraulic pressure in said first chamber, fluid passage means formed in said piston for fluid communication between said inlet port and said outlet port and variable orifice means for throttling fluid flow from said inlet port to said outlet port responsive to movement of said piston in said one direction.

3. A safety valve assembly comprising a stationary valve body housing, an inlet port, an outlet port, said ports being formed in said body, an axial bore formed in said body, a stepped piston having a larger part and a smaller part slidably mounted in said bore, a first chamber formed within said bore and defined in part by said larger piston part, means for fluidically connecting said inlet port with said first chamber for admitting hydraulic pressure to shift said piston in one direction, a second chamber formed within said bore and defined in part by said smaller piston part, spring means acting upon said piston so as to oppose hydraulic pressure in said first chamber, fluid passage means formed in said piston for fluid communication between said inlet port and said outlet port and variable orifice means for throttling fluid flow from said inlet port to said outlet port responsive to movement of said piston in said one direction, said variable orifice means being comprised of a first ring-shaped recess formed on the wall of said bore and a second ring-shaped recess formed on said piston and kept in fluid communication with said passage means formed within the body of said piston.

4. A safety valve as set forth in claim 3 wherein said second recess has a tapered bottom.

5. A safety valve assembly comprising a stationary valve body housing, an inlet port, an outlet port, said ports being formed in said body, an axial bore formed in said body, a stepped piston having a larger part and a smaller part slidably mounted in said bore, a first chamber formed within said bore and defined in part by said larger piston part, means for fluidically connecting said inlet port with said first chamber for admitting hydraulic pressure to shift said piston in one direction, a second chamber formed within said bore and defined in part by said smaller piston part, spring means acting upon said piston so as to oppose hydraulic pressure in said first chamber, fluid passage means formed in said piston for fluid communication between said inlet port and said outlet port, variable orifice means for throttling fluid flow from said inlet port to said outlet port responsive to movement of said piston in said one direction and locking means for locking said piston in a position with said variable orifice means closed when pressure difference as measured between said inlet port and said outlet port is larger than a predetermined value, said locking means comprising a ring-shaped groove formed on the outer periphery of said larger piston part and a ball mounted in a passage formed in said valve body and urged by a spring towards said groove.

6. A safety valve assembly comprising a pair of safety valve elements, each of the latter comprising a stationary valve body housing, an inlet port, an outlet port, said ports being formed in said body, an axial bore formed in said body, a stepped piston having a larger part and a smaller part slidably mounted in said bore, a first chamber formed within said bore and defined in part by said larger piston part, means for fluidically connecting said inlet port with said first chamber for admitting hydraulic pressure to shift said piston in one direction, a second chamber formed within said bore and defined in part by said smaller piston part, spring means acting upon said piston so as to oppose hydraulic pressure in said first chamber, fluid passage means formed in said piston for fluid communication between said inlet port and said outlet port, a variable orifice means for throttling fluid flow from said inlet port to said outlet port responsive to movement of said piston in said one direction, locking means for locking said piston when said piston is disposed in a position in which said fluid passage means is completely closed when the pressure differences as measured between said inlet port and said outlet port is larger than a predetermined value and additional fluid passage means for connecting said inlet port of one of said safety valve elements with said outlet port of the other of said safety valve elements when said piston of said one of said safety valve elements is locked by said locking means.

* * * * *